Sept. 12, 1933.　　　H. G. WEINLAND　　　1,926,472
GRINDING MACHINE
Filed July 28, 1932　　　4 Sheets-Sheet 1
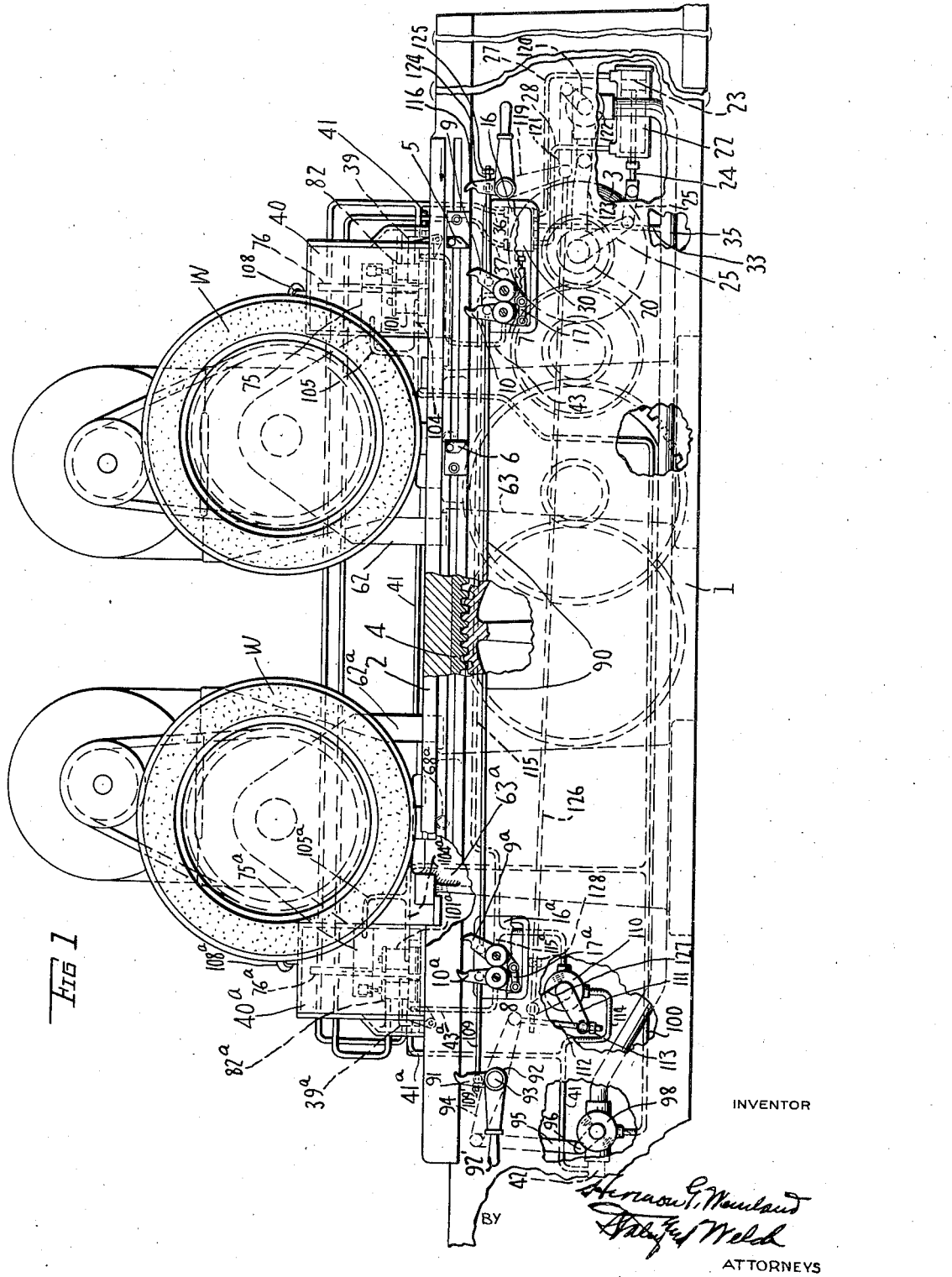

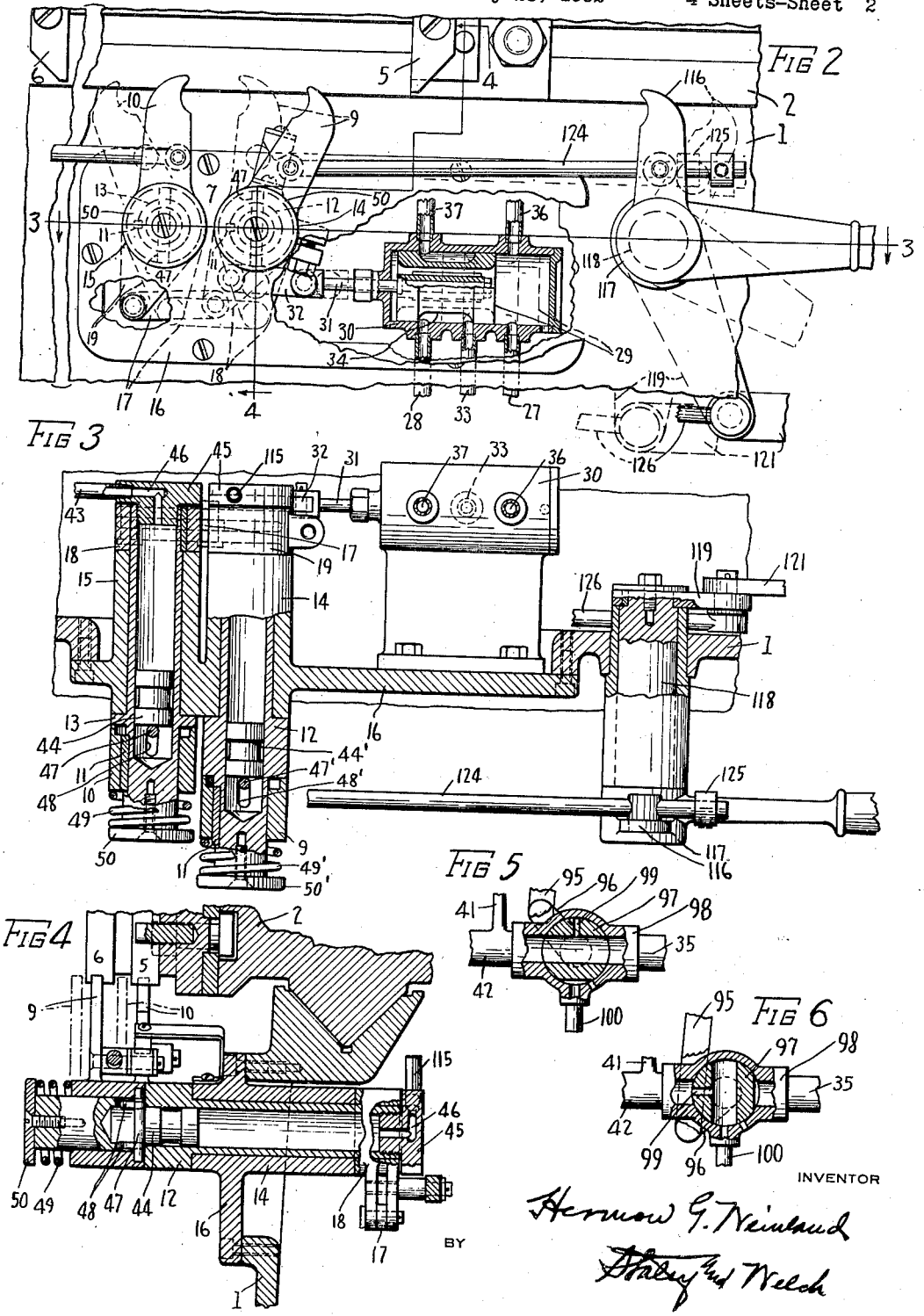

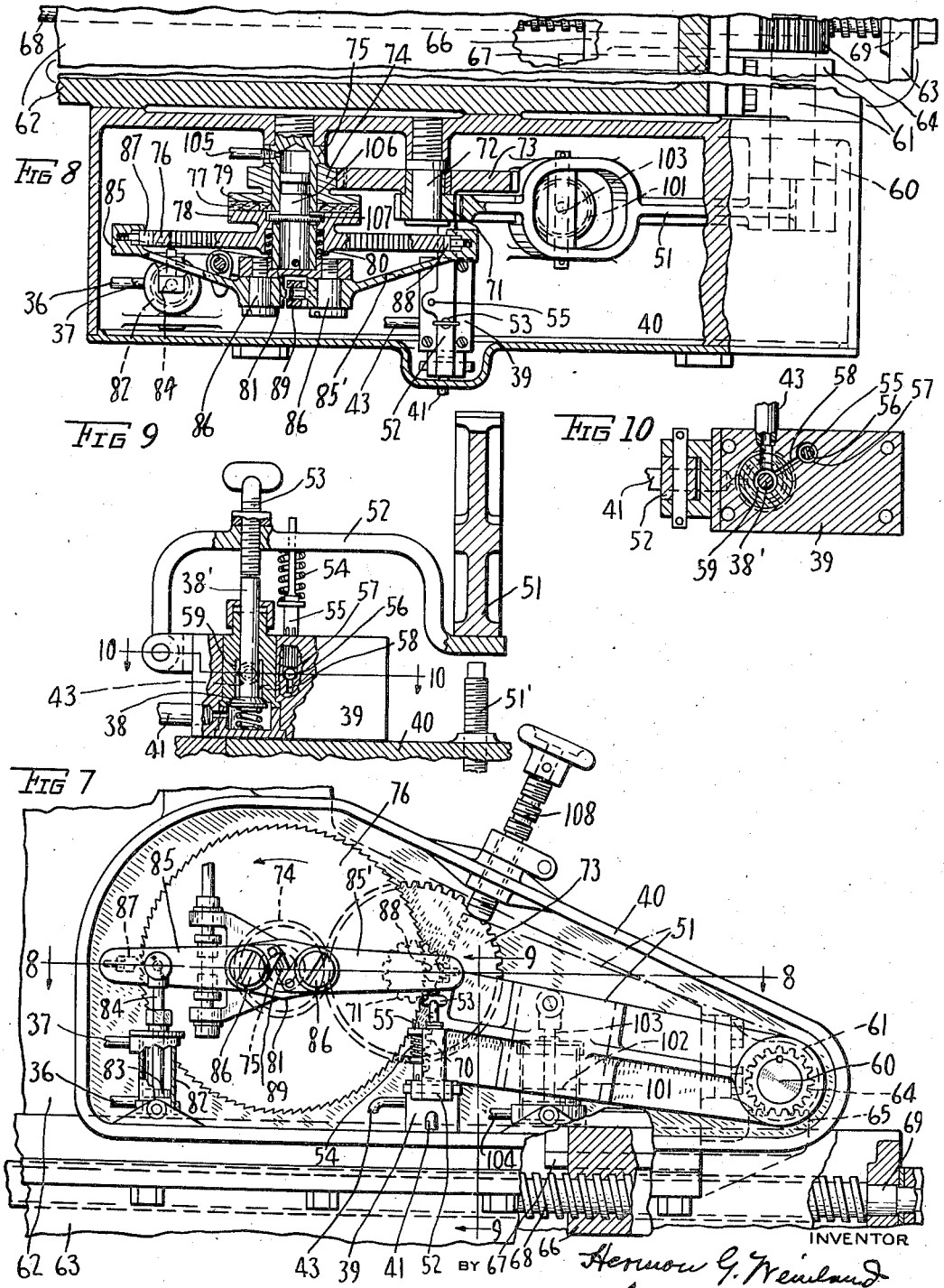

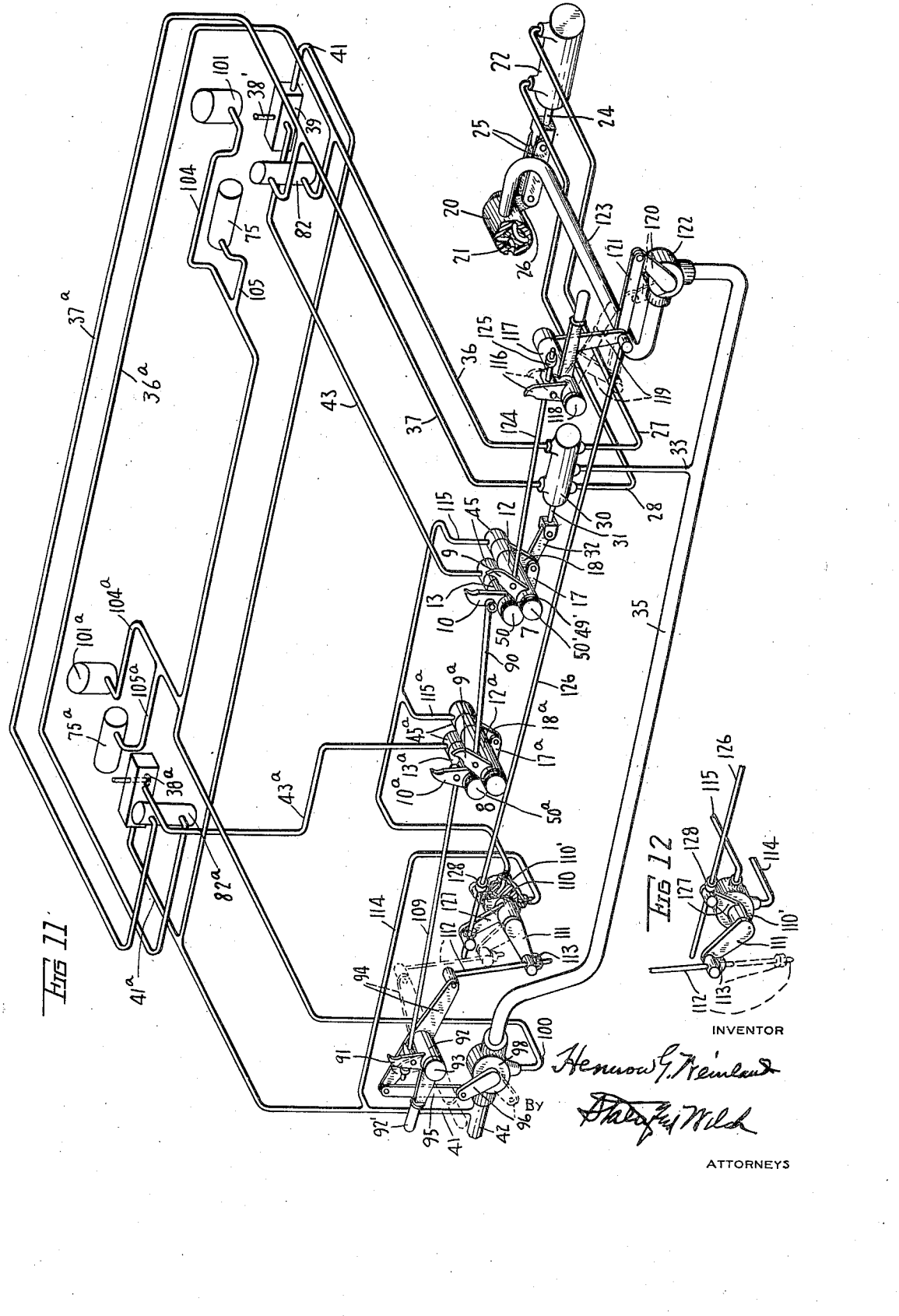

Patented Sept. 12, 1933

1,926,472

UNITED STATES PATENT OFFICE 1,926,472

GRINDING MACHINE

Hermon G. Weinland, Springfield, Ohio, assignor to The Safety Grinding Wheel & Machine Company, Springfield, Ohio, a corporation of Ohio Application July 28, 1932. Serial No. 625,257

14 Claims. (Cl. 51—122)

This invention relates to improvements in grinding machines, it more particularly relating to a machine of the type having a reciprocating work holder and a plurality of aligned tool holders which are intermittently fed to the work.

One of the objects of the invention is to provide means operated by the feeding movement of a tool holder to automatically control the work table whereby after a given number of reciprocations of the work table before a given tool holder the work table is advanced from that tool holder to the next tool holder in sequence.

A further object of the invention is to provide means controlled by the final tool holder for automatically controlling the work table whereby the work table after a given number of reciprocations before the final tool holder is advanced from that tool holder to an unloading position where the work may be removed; a further object in this connection being to provide means whereby when the work holder reaches unloading position all of the tool holders are restored to initial position.

A further object is to provide means whereby when the work table reaches unloading position certain of the tripping devices which control the reciprocation thereof before the respective tools are automatically placed in inoperative position whereby the work table may be permitted to be moved by its motor from the unloading position to a loading position at the opposite side of the machine; a further object in this connection being to arrest the motor when the table arrives at loading position and to automatically restore the trips.

Other objects will appear from the accompanying description.

In the accompanying drawings:

Fig. 1 is a front elevation of a grinding machine in which the principles of the invention are embodied.

Fig. 2 is a fragmentary front elevation and partly in vertical section, on a larger scale, of some of the details of the machine shown in Fig. 1, it being a view of a portion of the tripping mechanism.

Fig. 3 is a view partly in horizontal section and partly in top plan, the section being taken on the line 3—3 of Fig. 2.

Fig. 4 is a partial transverse section partly in elevation on the line 4—4 of Fig. 2, with portions of the parts shown in side elevation.

Fig. 5 is an enlarged view of a detail also shown in Figs. 1 and 11, partly in elevation and partly in longitudinal section.

Fig. 6 is a view similar to Fig. 5 but with the parts in a different working position.

Fig. 7 is a fragmentary side elevation on a larger scale, partly in transverse section, of a portion of the fluid operated feeding mechanism with the cover of the casing removed, and includes a partial side elevation of one of the tool heads.

Fig. 8 is a view partly in horizontal section and partly in plan, the sectional portion being taken on the line 8—8 of Fig. 7.

Fig. 9 is a fragmentary transverse section, partly in elevation, on a slightly enlarged scale on the line 9—9 of Fig. 7.

Fig. 10 is a horizontal section on the line 10—10 of Fig. 9.

Fig. 11 is a diagrammatic view in perspective showing on a slightly increased scale as compared to Fig. 1 the relation and interconnection of the parts employed in the fluid operated controlling mechanism.

Fig. 12 is a detached view in perspective of a portion of the mechanism illustrated in Fig. 11 in a different working position.

Referring to the drawings, the bed of the machine is indicated at 1. On its upper portion is mounted in any manner suitable for the reciprocatory movements thereof a work table 2. Motion is imparted to the work table by a reversible rotary fluid motor 3 connected by a train of spur gearing (Fig. 1) to a rack 4 secured to the under side of the work table. In the present case two tool holders 62 and 62$^a$ are employed, which are slidably mounted on lateral extensions 63 and 63$^a$, respectively, of the bed 1 (Fig. 1). The tool holders rotatably support cup grinding wheels W, the radial faces of which are the grinding faces, for which reason the slidable movement of the tool holders is at right angles to the path of travel of the work table.

The work table is reciprocated by changing the direction of rotation of the driving motor 3. The means for accomplishing this includes a pair of pivotal stop dogs 5 and 6 adjustably secured to the forward vertical edge of the work table and trip levers cooperating with the stop dogs. The trip levers are arranged in pairs, the pair controlling the reciprocations before the roughing wheel being indicated in general at W, while the pair indicated in the same manner at 8 control the reciprocations before the finishing tool holder. Since the construction of each of the pairs is identical, the description of the details of one pair will be understood to apply to the other, the corresponding parts of which are indicated by corresponding reference characters to which is added the exponent "a".

The trip levers of the pair W are represented at 9 and 10, each facing in opposite directions and slightly offset from each other (Fig. 4) so that the stop dogs, which are also offset, will strike only the proper trip lever. The trip lever 9 is slidably mounted on and keyed, by a spline key 11 (Fig. 3), to the reduced diameter extended portion of a short, hollow horizontally disposed rock shaft 12, and the trip lever 10 is similarly mounted on a rock shaft 13, the purpose of the slidable mounting appearing later. Each of the rock shafts is rotatably supported in parallel aligned bosses 14 and 15 arranged in a cover plate 16 (Figs. 1, 2, 3 and 4) secured over openings in the forward wall of the machine bed 1. The normal position of a trip lever is vertical, as shown by the full line position of the trip lever 10 in Fig. 2, from which position it is forced by direct contact with its respective stop dog 5 during the movement of the work table, and in order to provide that the trip lever 9, which is at this time in the inclined position as a result of a previous contact, shall be brought to the vertical position the rock shafts are linked together, there being a link 17 pivotally connected at each end to the free ends of short forked levers 18 and 19 secured to the inner ends of the rock shafts 12 and 13, one lever 18 being adjustably secured to the rock shaft 12, and the lever 19 being keyed to the rock shaft 13.

The reversal of the driving motor 3 is brought about by the swinging movements of the trip levers by fluid operated means under the control of a pilot valve which is itself reciprocated by direct connection with one of the rock shafts. In an extension 20 of the housing of the driving motor 3 is enclosed a reversing valve shown conventionally at 21 in Fig. 11, which when shifted from either of its positions reverses the direction of rotation of the driving motor and thereby reciprocates the work table. The reversing valve is actuated by means of a fluid motor consisting of a cylinder 22, a piston 23, and a piston rod 24, the piston rod being connected by links 25 to the lower end of the reversing valve lever 26.

Fluid under pressure is supplied alternately to each end of the reversing valve cylinder 22 through conduits 27 and 28 (Figs. 1, 2 and 11) under the control of a pilot valve 29 (Fig. 2) reciprocatorily mounted in the pilot valve cylinder 30. The pilot valve 29 is provided with a piston rod 31 whose outer end is connected by a link 32 to the lower end of the adjustable lever 18 previously mentioned as being secured to the rock shaft 12. In either of the working positions of the pilot valve one or the other of the conduits 27 or 28 is in communication with a supply conduit 33 (Fig. 2), the pilot valve being provided with a circumferential, centrally located groove 34, and, as shown in Fig. 2, is in position to supply fluid to the conduit 28 whereby the piston 23 of the reversing cylinder will be forced to the right. This causes the driving motor 3 to move the work table to the left, the movement continuing until the stop dog 5 strikes the trip lever 10, forcing the pilot valve 29 to the broken line position (Fig. 2) at the right, and thus supplying fluid to the opposite end of the reversing cylinder through the conduit 27, thereby changing the direction of the work table. The supply conduit 33 is connected with a main supply conduit, a portion of which is indicated at 35 (Figs. 1 and 11) extending between a pair of valves, a description of which is to follow.

At the time the pilot valve supplies fluid to the reversing cylinder 22 as described, it also diverts fluid alternately to two conduits 36 and 37 (Figs. 2 and 11). These conduits are branched and lead to small fluid motors with which the tool holder feeding mechanisms are equipped. Each tool holder is intermittently moved toward the work a predetermined distance by means to be described, and after the roughing operation is completed, the devices act to move one of the trip levers out of operative position, allowing the work table to advance to the finishing tool holder. In the same manner the work table is caused to leave the finishing tool holder at the completion of that operation and to proceed to the unloading position further to the left, at which point each tool head is retracted in a single movement.

The longitudinal movement of the trip lever 10 to inoperative position is accomplished by fluid-operated means acting thereon under the control of a valve operated by the roughing tool holder feeding mechanism. The valve is indicated at 38 (Fig. 9) and is enclosed in a housing 39 secured within the feeding mechanism casing 40 on the bottom wall thereof. When this valve 38 is opened, as is described later, fluid is permitted to flow from a conduit 41 connected with the main machine supply conduit 42 (Fig. 11) to a conduit 43 and therethrough to a small fluid motor incorporated in the rock shaft 13 (Fig. 3).

The interior of the rock shaft 13 is hollow for a greater portion of its length, and in this bore is fitted a small piston 44 (Figs. 3 and 4). When fluid is admitted to the bore of the rock shaft, the piston 44 is forced outwardly, bearing against a cross pin 47 inserted through elongated slots 48, one being shown in Fig. 3, in the walls of the rock shaft and causing the cross pin to force the trip lever 10 outwardly, the ends of the cross pin being in contact with the hub of the trip lever 10. The outward movement of the trip lever is resisted by a spring 49 which bears against a disk 50 secured to the outer end of the rock shaft. The spring 49 returns the trip lever to its normal position shown in full lines in Fig. 4 when the pressure in the bore of the rock shaft 13 is lowered. The inner end of the bore is closed by a plug 45 in which is a port 46 communicating with the conduit 43.

The valve 38 is opened by the downward movement of the segment arm 51 of the feeding mechanism (Figs. 7, 8 and 9). The segment arm 51 makes contact with a bent lever 52 which is pivotally connected at one end of the housing 39 and which is provided with an adjusting screw 53 with which contact is made with the upper end of the valve stem 38'. The lever 52 is partially supported by a coiled spring 54 interposed between the lever and the shoulder of a plunger 55 inserted in a vertical opening in the upper portion of the housing 39. The plunger rests on a ball 56 which acts as a valve to permit escape of fluid to atmosphere, the ball resting in a cavity 57 connected by a port 58 with the space 59 above the valve 38. The port 58 is thus in communication with the conduit 43, and when the valve 38 is closed, the pressure of the return spring 49 of the trip lever 10 forces the fluid back through the conduit 43 to atmosphere lifting the ball 56. It will be seen that the descending segment arm 51 increases the pressure on the ball, and thereby prevents loss of fluid when the valve 38 is opened.

The segment arm 51 is keyed to a shaft 60 rotatably supported in bearings, one bearing only being indicated at 61 (Figs. 7 and 8) secured to the rearward side of the tool holder 62. Near the center of the shaft 60 is provided a pinion 64 which meshes with a short rack 65 (Fig. 7). The rack 65 is integrally attached to a nut 66 which is slidably mounted on the under side of the tool holder 62 and retained by gibs 67. The nut 66 is threaded on a lead screw 68 rotatably supported in bearings, one of which is indicated at 69 (Fig. 7) in the lateral extension 63. It will then be clear that a downward movement of the segment arm 51 causes the tool holder 62 to move toward the work, and on an upward movement away therefrom, since the rack 65 is temporarily stationarily positioned by reason of its connection with the lead screw 68 for which longitudinal movement is not permitted. For initially setting the tool holder or for compensating for wear of the grinding element, the lead screw 68 is manually rotated by means not shown.

On the free end of the segment arm 51 are provided gear teeth 70, meshing with which is a pinion 71. The pinion 71 is rotatably mounted on a stud 72 (Fig. 8) projecting from the rear wall of the casing 40, and on the hub of the pinion 71 is keyed a gear 73, meshing with a pinion 74 rotatably mounted on a second stud 75 projecting from the rear casing wall. The stud 75 also rotatably supports a ratchet disk 76 which is connected by a frictional arrangement to the pinion 74, there being a fiber plate 77 interposed between an integral disk 78 attached to the ratchet disk 76 and an integral disk 79 attached to the pinion 74 (Fig. 8). The necessary friction is maintained by a coiled spring 80 positioned in a counter bore in the ratchet disk 76 bearing against a member 81 secured to the outer end of the stud 75. The purpose of the frictional arrangement will appear later.

The ratchet disk 76 is given a partial rotation in the direction of the arrow in Fig. 7 at each reversal of the work table, thereby moving the tool head toward the work. The partial rotation is accomplished by the use of a small fluid motor consisting of a cylinder 82 (Fig. 7), a piston 83 and a piston rod 84. The cylinder is pivotally connected to the lower wall of the casing 40, while the upper end of the piston rod is pivotally connected to one arm 85 of a pair of inter-connected arms, the other arm being indicated at 85'. The arms 85 and 85' are pivotally mounted on studs 86 fixed in the member 81 previously mentioned, and are provided with spring-pressed pawls located at their free ends, 87 indicating the pawl in the arm 85, and 88 the pawl in the arm 85'. The arms are connected at their adjacent pivotal ends by a link 89 so that when the arm 85 is forced upwardly by pressure in the lower end of the cylinder 82 received through the conduit 36 under control of the pilot valve 29, the arm 85' also swings upwardly. When a further impulse from the pilot valve is received through the conduit 37 into the upper end of the cylinder 82, the arms 85 and 85' are drawn downwardly.

The pawls are so positioned in the arms that the partial rotations of the ratchet disk are uni-directional; that is, on a downward stroke of the arms, the pawl 87 engages teeth while the pawl 88 rides over teeth; and, conversely, on an upward stroke, the pawl 88 engages teeth and carries further the partial rotation of the ratchet disk 76.

The rough grinding operation terminates when the valve 38 is opened by downward pressure thereon by the descending segment arm 51, and at the opening of the valve 38, the trip lever 10 is moved outwardly out of operative position, allowing the work table to continue its movement to the left, which movement continues until the stop dog 5 strikes the trip lever 10ª of the pair 8 of trip levers (Figs. 1 and 11). Further infeeding of the roughing tool holder during the finishing operation is prevented by a stop screw 51', (Fig. 9) threaded upwardly in the lower wall of the housing 40, whereby the segment arm 51 makes contact with the stop screw.

The movement of the work table to the left brings the work before the finishing tool holder, and reversals of the work table will occur at this portion of the machine under the control of the strip levers 9ª and 10ª of the pair 8 until the finishing operation is completed. In order that the pilot valve may also be actuated by this pair of trip levers, a linkage is provided consisting of a rod 90 (Figs. 1 and 11) pivotally connected at its ends to the trip levers 10 and 9ª.

The finishing tool holder 62ª (Fig. 1) is fed toward the work by a feeding arrangement similar to the mechanism just described in connection with the rough grinding tool holder except for the obvious reversed hand construction, and here also similar parts are designated with corresponding reference characters with the added exponent "a". When the finishing operation is completed, the work table is caused to move further to the left since the trip lever 10ª is moved out of operative position by the opening of a valve 38ª (Fig. 11) shown in broken lines, which valve is enclosed in a housing 39ª located in the finishing tool holder feeding mechanism. Fluid is conveyed to the housing 39ª by the conduit 41ª which conveys fluid to the housing 39ª and the conduit 43ª by which the fluid impulse is conducted to the fluid motor incorporated within the rock shaft 13ª which is exactly the same as that described in connection with the trip lever 10.

The movement of the work table to the left after leaving the finishing tool holder is arrested by stopping the work table drive motor 3 in the following manner, accompanied by a retraction of each tool holder to its original working position, the return of the trip levers 10 and 10ª to their normal position, also the outward movement of the trip levers 9 and 9ª of the pairs 7 and 8, respectively.

The stop dog 5 on the work table makes contact with a trip lever 91 (Figs. 1 and 11) placed a short distance to the left of the pair 8. The trip lever 91 is integrally attached to a hub 92 secured to a shaft 93 rotatably mounted in the forward wall of the base 1. On the inner end of the shaft 93 is fixed a double armed lever 94. One end of the lever 94 is connected by a link 95 to the lever 96 of a dual purpose valve 97 (Figs. 5 and 6) enclosed in a valve housing 98 (Figs. 1 and 11). As shown in Figs. 1, 5 and 11, the valve 97 is in its open position, whereby fluid is passed from the main machine supply conduit 42 to the conduit 35. As shown in Fig. 6, the valve 97 is closed insofar as supplying fluid to the conduit 35 is concerned, a small port 99, however, in the valve permitting a flow therethrough into the conduit 100, which divides into four branches, two leading to each feeding device (Fig. 11). The object of supplying fluid through these branched conduits is to bring about the retraction of the tool holders to their original working positions which is done in a single movement by fluid motors coacting with the feeding devices.

Each feeding device is provided with a fluid motor consisting of a cylinder, piston and piston rod. Reference is made to Figs. 7 and 8, as in these figures is shown such a motor connected with the roughing tool holder feeding device in sufficient detail for descriptive purposes, it being understood that an exactly similar motor is also used in the finishing tool holder, similar parts being designated by the corresponding reference characters with an exponent "a" added.

The cylinder, piston and piston rod of the roughing tool holder retraction motor are shown at 101, 102 and 103, respectively. The cylinder 101 is pivotally connected at its lower end to the inner bottom wall of the casing 40, while the upper end of the piston rod is connected to the segment arm 51. One of the branches, 104 of the conduit 100, leads to the lower portion of the cylinder 101, and thereby on closure of the valve 97 (Fig. 6) permits fluid to enter below the piston 102 and force upwardly the segment arm 51.

Before the arm 51 will move upwardly, however, the frictional engagement of the ratchet disk 76 with the gearing must be temporarily broken since an upward movement of the arm 51 would be resisted by one of the pawls 87 or 88. The engagement is broken by providing a small fluid motor incorporated in the hollow stud 75 (Fig. 8). A branch 105 (Figs. 8 and 11) of the conduit 104 leads to the interior of the stud 75, in which is fitted a small piston 106 (Fig. 8). The piston bears against a cross pin 107 positioned in axial slots in the walls of the stud, the ends of the pin projecting beyond the circumference of the stud and bearing against the hub of the ratchet disk 76. Thus, on an application of fluid pressure against the piston 106 which occurs simultaneously with pressure applied to the lower side of the piston 102, the frictional engagement is broken and the arm 51 is moved upwardly, the gearing rotating freely during the movement. The upward movement results in an opposite rotation of the pinion 64 which rolls back over the rack 65 and retracts the tool holder. The upward movement of the segment arm 51 is arrested by contact thereof with a stop screw 108 (Fig. 7) adjustably mounted in the upper wall of the casing 40.

The reversing valve 21 of the drive motor 3 is also automatically shifted by the movement of the trip lever 91, thereby insuring that when the machine is again started, the work table may be moved only to the right. The shifting is obtained by linking the trip lever 91 to the trip lever 10a of the pair 8 by a rod 109 (Figs. 1 and 11) which passes loosely through a swivel stud projecting from the side of the trip lever 91. A collar 109' is secured on the outer end of the rod 109, being placed closely adjacent the swivel stud when the trip levers 91 and 10a are each vertically disposed. Therefore, when the trip lever 91 is forced to the left, the rod 109 acts through each pair of trip levers to shift the pilot valve, which in turn changes the position of the reversing valve.

The movement of the work table to unloading position not only reverses the valve 21 to admit fluid to the opposite side of the motor 3 in order that the table may be moved in the opposite direction to loading position at the opposite side of the machine, but also places in inoperative position the trip levers 9 and 9a in the following manner:

The other end of the double armed lever 94 is connected by linkage which acts in one direction of movement only, to a simple shut-off valve 110, a portion of which is shown in Fig. 11 enclosed in a housing 110' (Figs. 11 and 12). The shut-off valve is provided with a pair of actuating levers arranged at an angle with each other. One arm 111 is connected by a rod 112 having a collar 113 to the end of the lever 94, the collar 113 being placed on the rod 112 below a swivel stud attached to the free end of the lever 111. The shut-off valve 110 is shown closed in Fig. 11, and is in the open position when the levers are in the position shown in Fig. 12.

The shut-off valve 110 controls admission of fluid flowing from the conduit 41 (Fig. 11) through a conduit 114 to a branched conduit consisting of branches 115 and 115a leading to the hollow rock shaft 12 of the pair 7 of trip levers and the hollow rock shaft 12a of the pair 8 of trip levers, respectively.

The rock shafts 12a and 13a constructed as described for the rock shafts 12 and 13 and the trip levers 9 and 9a are also outwardly movable in the same way, the movement occurring when the shut-off valve 110 is opened on contact of the stop dog 5 with the trip lever 91 at the unloading position.

In Fig. 3 the rock shaft 12 is shown provided with a piston 44', a cross pin 47' operating in a slot 48', a spring 49', a head 50' corresponding in all respects with the operating mechanism shown in connection with the rock shaft 13.

Thus, when the work table is to be returned to the loading position at the right of the bed, it is only necessary to raise the handle 92' which is attached to the hub 92 and lever 94, to the full line horizontal position, thereby re-opening the valve 97 and admitting fluid to the drive motor 3, and opening to atmosphere the tool holder retracting cylinders 101 and 101a and the friction releasing fluid motors in the shafts 75 and 75a. This movement of the lever 94 does not change the open position of the shut-off valve 110 (Fig. 12) as the collar 113 merely drops away from the swivel block on the downward movement of the rod 112. Consequently fluid pressure is still present in the rock shafts 12 and 12a allowing the stop dogs 6 to pass by the trip levers 9a and 9 on the movement of the work table to the right, while the stop dog 5 rides over the trip levers 10a and 10.

The work table is automatically stopped at the right end of the bed 1, by the contact of the stop dog 6 with a trip lever 116, which is mounted similarly to the trip lever 91 already described. The trip lever 116 extends upwardly from a hub 117 attached to a shaft 118 on whose inner end is mounted a lever arm 119. The lever arm 119 is connected to a lever 120 by a link 121, the lever 120 being secured to a drive motor shut-off valve (not shown) enclosed in the valve body 122 (Figs. 1 and 11). This shut-off valve is interposed in the main driving motor supply conduit, the conduit 35 being inserted in one side, and the conduit 123 leading to the extension 20 of the drive motor 3 being inserted in the other side of the valve body 120.

Therefore, when the stop dog 6 strikes the trip lever 116, the shut-off valve is closed, stopping the drive motor 3. Further, by linking the trip lever 116 with the trip lever 9, the pilot valve is shifted, resulting in a shift of the reversing valve 21, so that when the machine is again started, the work holder will move only to the left. The linkage by which this is accomplished is similar to the linkage shown at the left end of the machine, there being a rod 124 pivotally connected to the trip lever 9 passing through a swivel stud in the trip lever 116. A collar 125 is secured to the link 124 closely adjacent the right side of the swivel stud; the swing of the trip lever 116 to the right, therefore draws the trip lever 9 to the right with results as above noted.

Another function is accomplished during the automatic stopping of the work table at the loading position, in that the fluid motors in the rock shafts 12 and 12ᵃ are exhausted and the trip levers 9 and 9ᵃ are permitted to return to their normal positions. This is provided for by linking the lever 119 with the shut-off valve 110. The linkage consists of the rod 126 pivotally connected at one end to the lever 119, while at the other end the link passes through an opening in a swivel stud secured to the side of a lever 127, which with the lever 111 is attached to the shut-off valve 110. On the link is secured a collar 128 at some distance from the swivel stud when in the closed position seen in Fig. 11, but adjacent the swivel stud when in the position seen in Fig. 12, so that the movement to the left of the link 126 closes the shut-off valve 110.

Having thus described my invention, I claim:

1. In a grinding machine, a plurality of independently operable tool holders, feeding means for each holder, a work table, a motor for reciprocating same, a plurality of pairs of tripping devices to reverse the motor, and automatic means operated by feeding movement of the tool holder before which the table is reciprocating to throw one of the tripping devices then controlling the motor out of operative position to permit the table to move to the next succeeding tool and under the control of the next succeeding pair of tripping devices.

2. In a grinding machine, a plurality of independently operable tools, a work table, a motor to reciprocate said table, means to feed said tools, means to cause said table to reciprocate in operative relation with but one of said tools, means controlled by the feeding movement of that tool to place the table in operative relation with the next succeeding tool, means for causing said table to reciprocate only in operative relation with said last mentioned tool.

3. In a grinding machine, a work table, a motor to reciprocate said table, a pair of independently operable tools, means to feed said tools, a pair of trips operated by the table to reverse the motor to cause the table to reciprocate by only one of said tools, a second pair of trips to cause the table to reciprocate only by another tool, and means to throw one of said first-mentioned trips into inoperative position to permit the table to move to a position controlled by the second mentioned pair of trips.

4. In a grinding machine, a plurality of independently operable tool holders, feeding means for each holder, a work table, a motor for reciprocating same, a plurality of pairs of tripping devices to reverse the motor, automatic means operated by the feeding movement of the initial tool holder to throw one of the tripping devices then controlling the motor out of operative position to permit the table to move to the next tool and under the control of the next succeeding pair of tripping devices, and automatic means operated by the feeding movement of the final tool holder to throw one of the tripping devices then controlling the table out of operative position to permit said table to be moved by said motor to an unloading position.

5. In a grinding machine, a plurality of independently operable tool holders, feeding means for each holder, a work table, a motor for reciprocating same, a plurality of pairs of tripping devices to reverse the motor, automatic means operated by the feeding movement of the initial tool holder to throw one of the tripping devices then controlling the motor out of operative position to permit the table to move to the next tool and under the control of the next succeeding pair of tripping devices, automatic means operated by the feeding movement of the final tool holder to throw one of the tripping devices then controlling the table out of operative position to permit said table to be moved by said motor to an unloading position, and means controlled by the table at the unloading position for moving all of the tool holders to initial position.

6. In a grinding machine, a plurality of independently operable tools, a work table, a motor to reciprocate said table, means to feed said tools, means to cause said table to reciprocate in operative relation with but one of said tools, means controlled by the feeding movement of that tool to place the table in operative relation with the next succeeding tool, means for causing said table to reciprocate only inoperative relation with said last mentioned tool, and means operable by the feeding movement of the final tool to permit the motor to move the table to unloading position.

7. In a grinding machine, a plurality of independently operable tools, a work table, a motor to reciprocate said table, means to feed said tools, means to cause said table to reciprocate in operative relation with but one of said tools, means controlled by the feeding movement of that tool to place the table in operative relation with the next succeeding tool, means for causing said table to reciprocate only in operative relation with said last mentioned tool, means operable by the feeding movement of the final tool to permit the motor to move the table to unloading position, and means controlled by the table at its unloading position to return the tools to initial position.

8. In a grinding machine, a work table, a motor to reciprocate said table, a plurality of independently operable tools, means to feed said tools, a pair of trips operated by the table to reverse the motor to cause the table to reciprocate by but one of said tools, a second pair of trips to cause the table to reciprocate only by another tool, means to throw one of said first mentioned trips to inoperative position to permit the table to move to a position controlled by the second mentioned pair of trips, and means operable by the feeding movement of the final tool to throw one of the last mentioned pair of trips out of operative position to permit the motor to move the table to unloading position.

9. In a grinding machine, a work table, a motor to reciprocate said table, a plurality of independently operable tools, means to feed said tools, a pair of trips operated by the table to reverse the motor to cause the table to reciprocate by but one of said tools, a second pair of trips to cause the table to reciprocate only by another tool, means to throw one of said first mentioned trips into inoperative position to permit the table to move to a position controlled by the second mentioned pair of trips, means operable by the feeding movement of the final tool to throw one of the last mentioned pair of trips out of operative position to permit the motor to move the table to unloading position, and means controlled by the table at its unloading position to return both tools to initial position.

10. In a grinding machine, a plurality of independently operable abrasive elements, a work table, a motor for reciprocating the same, automatic means for causing said table to reciprocate successively in operative relation with each of said elements, automatic means to cause the motor to move the table to unloading position after a predetermined number of reciprocations by the final abrasive element, means controlled by the table to stop the motor at the unloading position, and manual means for starting the motor to move the table to a loading position at the opposite side of the machine.

11. In a grinding machine, a plurality of independently operable tool holders, feeding means for each holder, a work table, a motor for reciprocating same, a plurality of pairs of tripping devices to reverse the motor, automatic means operated by the feeding movement of the tool holder before which the table is reciprocating to throw one of the tripping devices then controlling the motor out of operative position to permit the table to move to the next tool and under the control of the next succeeding pair of tripping devices, automatic means operated by the feeding movement of the final tool holder to throw one of the tripping devices then controlling the table out of operative position to permit said table to be moved by said motor to an unloading position, automatic means for stopping the motor at the unloading position of the table, automatic means to restore said tripping devices to operative position and throwing other tripping devices to inoperative position, manual means to start the motor to move the table to a loading position at the opposite side of the machine, and automatic means to stop the motor at the loading position and restore the last mentioned tripping devices to operative position.

12. In a grinding machine, a plurality of independently operable tools, a work table, a fluid motor to reciprocate said table, fluid supply means for said motor including a reversing valve, means to feed said tools, means to cause said table to reciprocate in operative relation with but one of said tools, means controlled by the feeding movement of that tool to place the table in operative relation with the next succeeding tool, means for causing said table to reciprocate only in operative relation with said last mentioned tool, means operable by the feeding movement of the final tool to permit the motor to move the table to unloading position, automatic means to stop the motor at the unloading position and reverse said valve, manual means to start the motor to move the table to a loading position at the opposite side of the machine, and automatic means to stop the motor at the loading position.

13. In a grinding machine, a plurality of independently operable abrasive elements, a work table, a fluid motor for reciprocating the same, automatic means for causing said table to reciprocate successively in operative relation with each of said elements, automatic means to cause the motor to move the table to unloading position after a predetermined number of reciprocations past the final abrasive element, means controlled by the table to stop the motor at the unloading position and to reverse the fluid supply to said motor, manual means for starting the motor to move the table to a loading position at the opposite side of the machine, and means controlled by the table to stop the motor at the loading position.

14. In a grinding machine, a plurality of independently operable tools, a work table, a fluid motor to reciprocate said table, fluid supply means for said motor including a reversing valve, means to feed said tools, a pair of tripping devices to cause said table to reciprocate in operative relation with but one of said tools, a second pair of tripping devices to cause said table to reciprocate in operative relation with another of said tools, means controlled by the feeding movement of the first tool to place one of said first mentioned tripping devices in inoperative position to permit the table to be moved by the motor to the next succeeding tool and under the control of the succeeding pair of tripping devices, means operable by the feeding movement of the final tool to place one of said last mentioned tripping devices in inoperative position to permit the motor to move the table to unloading position, automatic means controlled by the table to stop the motor at the unloading position, reverse said reversing valve, restore the tripping devices to operative position and restore the tools to initial position, means controlled by the table at the unloading position to throw the other tripping device of each set out of operative position, manual means to start the motor to move the table to a loading position at the opposite side of the machine, and automatic means controlled by the table to stop the motor at the loading position and to restore the last mentioned tripping devices to operative position.

HERMON G. WEINLAND.